United States Patent [19]
Toulhoat et al.

[11] Patent Number: 6,028,236
[45] Date of Patent: Feb. 22, 2000

[54] PROCESS FOR SLOWING THE GROWTH AND/OR AGGLOMERATION OF HYDRATES IN A PRODUCTION EFFLUENT

[75] Inventors: Hervé Toulhoat, Herblay; Anne Sinquin, Nanterre, both of France

[73] Assignee: Institut Francais du Petrole, Rueil-Malmaison Cedex, France

[21] Appl. No.: 09/199,481

[22] Filed: Nov. 25, 1998

[30] Foreign Application Priority Data

Nov. 25, 1997 [FR] France .................................. 97 14890

[51] Int. Cl.[7] ....................................................... C07C 7/20
[52] U.S. Cl. ................................................. 585/15; 95/153
[58] Field of Search ................................. 585/15; 95/153

[56] References Cited

FOREIGN PATENT DOCUMENTS

| | | |
|---|---|---|
| 0 323 774 | 7/1989 | European Pat. Off. . |
| 0 323 775 | 7/1989 | European Pat. Off. . |
| 0 582 507 | 2/1994 | European Pat. Off. . |
| 0 789 132 | 8/1997 | European Pat. Off. . |

*Primary Examiner*—Walter D. Griffin
*Assistant Examiner*—Nadine Preisch
*Attorney, Agent, or Firm*—Millen, White, Zelano & Branigan, P.C.

[57] ABSTRACT

The process for slowing the growth and/or agglomeration of hydrates in a fluid comprising water and gases comprises adding gas hydrate growth and/or agglomeration inhibitors comprising an essentially water soluble polymer, characterized by a total number of rotational degrees of freedom per statistical repeat unit RDFTm of over 9, preferably over 10, and a degree of polymerization DP of a statistical repeat unit in the range 18/RDFTm to 200,000, preferably in the range 20/RDFTm to 100,000. The growth and/or agglomeration inhibitor(s) is/are generally incorporated into the fluid to be treated in a concentration of 0.05% to 5% by weight with respect to the amount of water in the medium.

10 Claims, No Drawings

PROCESS FOR SLOWING THE GROWTH AND/OR AGGLOMERATION OF HYDRATES IN A PRODUCTION EFFLUENT

The invention relates to a process for inhibiting or retarding the growth and/or agglomeration of hydrates of natural gas, oilwell gas or other gases, using at least one additive. Gases which form hydrates can comprise at least one hydrocarbon selected from methane, ethane, ethylene, propene, propene, n-butane and iso-butane, and possibly $H_2S$ and/or $CO_2$.

The invention also relates to a method for determining the effectiveness of a water soluble polymer type additive in such a process.

Such hydrates form when water is found in the presence of gas, either in a free state or dissolved in a liquid phase such as a liquid hydrocarbon, and when the temperature reached by the mixture, in particular water, gas and possibly liquid hydrocarbons such as oil, drops below the thermodynamic hydrate formation temperature, that temperature being fixed for a known composition of gases at a fixed pressure.

Hydrate formation is feared, in particular in the gas and oilwell industry where the hydrate formation conditions can be satisfied. In order to reduce the production costs of crude oil and gas, both as regards investment and exploitation, one route, particularly for offshore production, is to reduce or even do away with treatments carried out on the crude or the gas to be transported from the field to the coast and in particular to leave all or part of the water in the fluid to be transported. Offshore treatments are generally carried out on a platform located on the surface near the field, such that the effluent, which is initially hot, can be treated before the thermodynamic hydrate formation conditions are satisfied when sea water cools the effluent.

However in practice, when the thermodynamic conditions required for hydrate formation are satisfied, hydrate agglomeration causes the transport conduits to block by the formation of plugs which prevent the passage of any crude oil or gas.

Hydrate plug formation can cause a production stoppage and thus result in substantial financial losses. Further, restarting the installation, especially when it involves offshore production or transport, can be a long process, as it is difficult to decompose the hydrates which have formed. When the production from an undersea natural gas or crude oil and gas field comprising water reaches the surface of the sea bed and is then transported along the sea bottom, the reduction in the temperature of the effluent produced can mean that the thermodynamic conditions for hydrates to form are satisfied and they form, agglomerate and block the transfer conduits. The sea bottom temperature can, for example, be 3° C. or 4° C.

Favourable conditions for hydrate formation can also be satisfied onshore when conduits are not buried (or are not buried deeply) in the soil, for example when the ambient air temperature is low.

In order to overcome these disadvantages, prior authors have sought products which when added to a fluid can act as inhibitors by reducing the thermodynamic hydrate formation temperature. They are mainly alcohols, such as methanol, or glycols such as mono-, di- or tri-ethylene glycol. This solution is very expensive as the quantity of inhibitors which have to be added can be as high as 10% to 40% of the amount of water and such inhibitors are difficult to recover completely.

Insulation of the transport conduits has also been recommended, to prevent the temperature of the transported fluid from reaching the hydrate formation temperature under the operating conditions. However, this technique is also very expensive.

The use of additives which can modify the hydrate formation mechanism have also been described where, instead of rapidly agglomerating together to form plugs, the hydrates formed disperse in the fluid without agglomerating and without obstructing the conduits. Examples in this regard are: the Applicant's European patent application EP-A-0 323 774 which describes the use of non-ionic amphiphilic compounds selected from esters of polyols and carboxylic acids, which may or may not be substituted, and compounds containing an imide function; the Applicant's European patent application EP-A-0 323 775, which describes the use of compounds of the family of fatty acid diethanolamides or fatty acid derivatives; U.S. Pat. No. 4,856,593 which describes the use of surfactants such as organic phosphonates, phosphate esters, phosphonic acids, their salts and their esters, inorganic polyphosphates and their esters, and homopolyacrylamides and acrylamide-acrylate copolymers; and European patent application EP-A-0 457 375, which describes the use of anionic surfactants such as alkylarylsulfonic acids and their alkali metal salts.

Amphiphilic compounds obtained by reacting at least one succinic derivative selected from the group formed by polyalkenylsuccinic anhydrides and acids with at least one polyethylene glycol monoether have also been proposed for reducing the tendency of hydrates of natural gas, oilwell gas or other gases to agglomerate (EP-A-0 582 507).

Further, the use of additives which can inhibit or retard the formation and/or growth of hydrates has been recommended. EP-A-0 536 950 describes the use of tyrosine derivatives; International patent application WO-A-93 25798 describes the use of homopolymer and copolymers of N-vinyl-2-pyrrolidone and mixtures thereof; and WO-A-94 12761 and U.S. Pat. No. 5,432,292 describe the use of poly(N-vinyl-2-pyrrolidone), hydroxyethyl cellulose and mixtures thereof or a terpolymer based on N-vinyl-2-pyrrolidone, N-vinyl-ε-caprolactame and dimethylaminoethyl methacrylate, sold under the trade name GAFFIX VC-713. International patent application WO-A-95 19408 more generally describes the use of aliphatic polymers containing carbonylated N-heterocycles in complex formulations. Similarly, WO-A-95 32356 describes the use of a terpolymer based on N-vinyl-2-pyrrolidone, acrylamido methyl propane sulfonate and acrylamide. WO-A-95 17579 and WO-A-96 04462 describe the use of alkylated ammonium, sulfonium and phosphonium derivatives, used alone or mixed with a corrosion inhibitor.

Finally, International patent application WO-A-97 07320 describe the use of additives with a polymeric backbone and a "guest" group which can be inserted into cavities in the hydrates, the latter being bonded to the polymeric backbone via an "anchoring" group. Such additives are gas hydrate formation and/or agglomeration inhibitors if they satisfy the following criteria: the polymeric backbone associated with the "anchoring" and "guest" groups must result in an essentially water soluble additive, the "anchoring" group must be hydrophilic and contain 1 to 4 atoms which can form hydrogen bonds, and the "guest" group is hydrophobic or amphiphilic with an average van der Waals diameter in the range 3.8 to 8.6 Angstroms and with a ratio of the number of carbon atoms to heteroatoms of 2 to 1 or more.

We have now discovered that low concentrations of certain essentially water soluble compounds can retard the growth and/or agglomeration of natural gas, oilwell gas or other gas hydrates, and with a very high efficiency. These compounds also optionally have a hydrate formation inhibiting effect.

Thus the invention provides a process for retarding the growth and/or agglomeration and optionally for retarding the formation of hydrates in a fluid comprising water and a gas, under conditions under which hydrates can form (from the water and the gas), characterized in that at least one essentially water soluble polymer is incorporated into said fluid, the polymer being characterized by a flexibility of statistical repeat units (or monomers) which is above a certain threshold, and a range of molecular weights. The flexibility of the polymer is measured by the index RDFTm, the total number of rotational degrees of freedom per statistical repeat unit which will be more precisely defined below. The molecular weight is characterized by the average degree of polymerisation DP of the statistical repeat unit. In accordance with the invention, RDFTm must be over 9 and preferably over 10, while DP is in the range 18/RDFTm to 200,000, preferably in the range 20RDFTm to 100,000.

The growth and/or agglomeration structure(s) considered in the present invention is/are characterized in that it/they fall into a range defined by two parameters identified as the determining structural descriptors of the inhibiting activity. These descriptors were determined as follows.

The direct link between the heat of adsorption of an impurity at the crystal/growth solution interface and the slowdown in crystalline growth is well established in the scientific literature (see, for example, "*Concepts de la crystallisation en solution*", Boistelle R., in "Actualités Néphrologiques", Crosnier et al., Eds., Flammarion Médecine Sciences, 1985, p. 159–202). The heat of adsorption of a large number of water soluble polymers at the water/methane hydrate interface have been determined. Such heat of adsorption determinations result from molecular dynamic simulations carried out with highly detailed and carefully validated atomistic models. Following this research, it was discovered that the microscopic origin of the affinity of a water soluble polymer for a water/methane hydrate interface resides principally in a reduction in the average intramolecular energy of deformation of the additive when it is transferred from the solvent to the interface. The part played by specific interactions such as the hydrogen bond or non specific interactions such as van der Waals forces was proved to be negligible both for neutral polymers and for the polyelectroytes which were modelled. It turned out that the affinity of a polymer for the interface was primarily determined by its microscopic deformability, or flexibility, which can be characterized by its RDFTm value, the calculation method for which is defined below. Thus the existence was discovered of a linear correlation between the heat of adsorption per statistical repeat unit (or monomer) $Q_{ads}$ of a water soluble polymer type additive at the water/hydrate interface and the total number of rotational degrees of freedom per monomer (RDFTm). It was then experimentally confirmed that the RDFTm index can effectively classify, a priori, the inhibiting effect on the growth and/or agglomeration of gas hydrates.

RDFTm, the total number of rotational degrees of freedom per statistical repeat unit, is defined as the ratio between Nrot and DP, where Nrot is defined by formula (4.12) on page 88 of the book "Prediction of Polymer Properties, Second Edition, Revised and Expanded" by Jozef Bicerano, Marcel DEKKER Inc., New York, 1996. In this formula, Nrot=NBBrot+NSGrot. The parameters NBBrot and NSGrot, heuristic flexibility descriptors, are real numbers calculated using the following rules:

1) Each single bond of the polymer backbone contributes +1 to NBBrot provided that this single bond is not included in a ring.
2) Each single bond in a side group or connecting a side group to the backbone contributes +1 to NSGrot, provided that:
   a) a rotation about the axis of that bond changes the co-ordinates of at least one atom; and
   b) that single bond is not included in a ring.
3) If the co-ordinates of all of the atoms remain unchanged after rotation of a single bond in a side group about its axis or about the axis of a single bond connecting a side group to the backbone, this single bond does not contribute towards NSGrot.
4) Multiple bonds, either included in the backbone or in the side groups, contribute neither to NBBrot nor to NSGrot.
5) The bonds included in rigid rings, either in the backbone or in the side groups, contribute neither to NBBrot nor to NSGrot.
6)
   a) Each bond in a "flexible" ring included in the backbone contributes +0.5 to NBBrot.
   b) Each bond in a "flexible" ring included in a side group contributes +0.5 to NSGrot.
7)
   a) The bonds of a "semi-flexible" ring binding it directly to a "rigid" ring contribute neither to NBBrot nor to NSGrot.
   b) Each single bond in a "semi-flexible" ring not directly connected to one of the "rigid" rings with which it is condensed contributes +0.5 either to NBBrot or to NSGrot.

The backbone of a polymer or of a statistical repeat unit of this polymer is defined as a percolating path which joins the ends of a graph constituted by bonds between atoms other than hydrogen. A side group is defined as the portion of the graph connected to the backbone by one single bond.

"Rigid" rings are rings which are aromatic in nature. "Semi-flexible" rings are "flexible" rings condensed with "rigid" rings. All other rings are "flexible" rings. All of these definitions originate from the reference work cited above.

In the process of the invention, polymers such as those described above can be added to the fluid to be treated alone or as a mixture of two or more thereof. When several polymers are used as a mixture, they may be homopolymers or copolymers which differ, for example, in the nature of the moieties of which they are composed and/or by their molecular weight.

The polymer or mixture of polymers can be added in any proportions to the fluid to be treated in concentrations generally of 0.05% to 5% by weight, preferably 0.1% to 2% by weight, with respect to the water present in the fluid to be treated.

Further, the polymer or the mixture of polymers recommended as an additive of the invention can be mixed with one or more alcohols (monoalcohols or polyols) containing, for example, 1 to 6 carbon atoms, more particularly mono-, di- or tri-ethylene glycol, ethanol or methanol, the latter being the preferred alcohol. This alcohol (or these alcohols) is (are) generally added in proportions of 0.5% to 20% by weight, preferably 1% to 10% by weight with respect to the water present in the fluid to be treated. The polymer or mixture of polymers considered in the invention can thus first be dissolved in a hydro-alcoholic medium and then added to the medium to be treated, to obtain final additive concentrations of 0.05% to 5% by weight, preferably 0.1% to 2% by weight with respect to the water present in the fluid to be treated.

The presence in the medium of additive(s) retarding growth and/or agglomeration and optionally having an inhibiting effect on formation, such as the recommended polymers or a mixture of the polymers and alcohol(s) such as methanol, for example, can, by their combined action, slow hydrate growth and considerably slow down plug formation in the conduits, while reducing the quantities of additives used [alcohol(s) and polymer(s)], and in particular while enabling a much lower temperature range to be used.

The essentially water soluble polymer or mixture of polymers considered in the invention can be used either in pure water, for example in condensation water, or in a saline medium, for example in production water, sea water or in brine.

The entire disclosure of all applications, patents and publications, cited above and below, and of corresponding French application 97/14890, filed Nov. 25, 1997, are hereby incorporated by reference.

The invention will be better understood from studying the following non limiting experiments. Examples 4 to 9 are given by way of comparison and do not form part of the invention.

EVALUATING THE STRUCTURAL DESCRIPTORS DETERMINING THE INHIBITING ACTIVITY OF THE ADDITIVES

Without in any way limiting the scope of the invention, the parameter Nrot can easily be calculated from the developed formula of any polymer using the "Synthia" module in the "Insight II" program marketed by Molecular Simulations Inc., 9685 Scranton road, San Diego, Calif. 92121-3752, USA.

RDFTm values were determined for each type of statistical repeat unit using the "Synthia" module. Further, the minimum degree of polymerisation DPmin (preferably 20/RDFTm)—the minimum degree of polymerisation necessary for the structure to adsorb onto the hydrate crystal— was calculated, and finally the value DPeff, the effective degree of polymerisation of the test sample, was calculated when the average molecular weight of the polymer was known.

EXPERIMENTAL METHOD

The experimental procedure for selecting the additives was carried out using tetrahydrofuran (THF) hydrates. A pure water/THF solution (80/20 by weight) forms hydrates at atmospheric pressure at 4° C. (see *"Kinetic Inhibitors of Natural Gas Hydrates"*, Sloan, E. D. et al., 1994).

The apparatus used was constituted by 16 mm diameter tubes into which 8 ml of an aqueous 20% by weight THF solution, if appropriate containing the additive to be tested, was introduced. An 8 mm diameter glass bead was introduced into each tube to ensure proper mixing of the solution. The tubes were placed on a rotary mixer which rotated at 20 rpm. The mixer was placed in a refrigerated chamber at 2° C.

The principle of these test was to determine the time Δt required to form a given quantity of hydrates. This time Δt corresponded to the interval measured between the moment when hydrate formation was observed (appearance of cloudiness) and the moment when a 1 cm thick hydrate plug formed in the tube.

Each series of tests was carried out in the presence of a reference mixture containing no additive, and the Δt recorded for an additive corresponded to an average time over 16 tests.

The results obtained by calculation or by experiment are shown in Table 1 below.

TABLE 1

| Additive (mole % of units) | Concentration (weight %) | Operating conditions | RDFTm | DPmin | DPeff | Δt (min) |
|---|---|---|---|---|---|---|
| Ex. 1: | | | | | | |
| •No additive | / | pure water/THF at 2° C. | | | | 17.0 |
| •PGA | 0.25 | " | 14 | 1 | 17000 | 25.3 |
| •Homopolymer AMPS | 0.5 | " | 10 | 2 | 22 | 23.9 |
| •Macromer M | 0.5 | " | 23 | 1 | 1 | 21.4 |
| •Homopolymer A | 0.5 | " | 23 | 1 | 45 | 30.7 |
| Ex. 2: | | | | | | |
| •No additive | / | water + 5% MeOH/THF at −1° C. | | | | 23.0 |
| •Macromer M | 0.5 | " | 23 | 1 | 1 | 26.3 |
| Ex. 3: | | | | | | |
| •No additive | / | 3.5% NaCl/THF at −1° C. | | | | 22.3 |
| •Macromer M | 0.5 | " | 23 | 1 | 1 | 27.1 |
| •Homopolymer A | 0.5 | " | 23 | 1 | 45 | 33.1 |
| •No additive | — | pure water/THF at 2° C. | | | | 17 |
| •Ex. 4: | 0.5 | " | 5.5 | 4 | 4545 | 19 |
| •Ex. 5: | 0.5 | " | 5.5 | 4 | 13640 | 17.5 |
| •Ex. 6: | 0.5 | " | 4 | 5 | 14300 | 17.1 |
| •Ex. 7: | 0.5 | " | 4 | 5 | 14160 | 7.7 |
| •Ex. 8: | 0.5 | " | 8.1 | 3 | N.D.* | 12.9 |

TABLE 1-continued

| Additive (mole % of units) | Concentration (weight %) | Operating conditions | RDFTm | DPmin | DPeff | Δt (min) |
|---|---|---|---|---|---|---|
| •Ex. 9: | 0.3 | " | 8.1 | 3 | N.D.* | 12.9 |
| •Ex. 10: | 0.5 | " | 5.6 | 4 | 83600 | 13.1 |
| •No additive | / | 3.5% NaCl/THF at −1° C. | | | | 22.3 |
| •Ex. 10: | 0.3 | " | 5.6 | 4 | 83600 | 20.4 |

*N.D. = not determined.

EXAMPLE 1

Under the operating conditions described above, the average Δt for pure water/THF solutions was 17.0 minutes.

A propylene glycol alginate (PGA) was tested at a concentration of 0.25% by weight under the conditions described above.

For this additive, the RDFTm was 14 and the DPeff (17,000) was much higher that DPmin (1). Using the selection criteria of the invention, this additive had to be effective.

The average Δt measured for this additive was 25.3 minutes: the additive was effective.

Under the operating conditions, adding 0.5% by weight of polyethylene glycol monomethacrylate containing 6 ethylene glycol sequences, termed M in the remainder of the text, substantially reduced the rate of growth of THF hydrate crystals. The average at moved from 17 minutes for water to 21.4 minutes in the presence of additive. In the same manner, this additive was well inside the range of effective additives delimited by the following values: an RDFTm preferably of over 10 and a DPeff preferably in the range from 20/RDFTm to 100,000.

From macromer M, a homopolymer was synthesized by aqueous phase radical polymerisation. This polymer, homopolymer A, contained 45 macromer units.

Like the macromer, the structural descriptors calculated for this homopolymer satisfied the criteria for an effective additive. Logically, and under these conditions, the "polymer effect", i.e., an increase in the number of effective statistical repeat units, should lead to an improvement in performance with respect to macromer M.

Adding 0.5% of homopolymer A to the mixture increased the Δt to 30.7 minutes (instead of 21.4 minutes for macromer M).

The above hypothesis was confirmed; the number of inhibitor monomers being higher, the polymer was more effective than the monomer.

A solution of 0.5% by weight of a homopolymer of sodium 2-acrylamido-2-methyl propane sulfonate polymer (AMPS) with an average molecular weight of about 5000 was also tested in pure water at 2° C. An RDFTm of 10 was calculated for this polymer, its effective degree of polymerisation being about 22. This polymer should decrease the crystal growth rate. Poly (AMPS) indeed had an inhibiting effect, as the average Δt measured for this additive was 23.9 minutes.

The values for macromer M and homopolymer A, with an RDFTm of 23 and respective DPeff of 1 and 45, remain unchanged regardless of the solvent used for the test (hydroalcoholic or saline medium). Examples 2 and 3 confirm that these two samples preserved their ability to inhibit hydrate growth (see the experimental results for Examples 2 and 3).

EXAMPLE 2

The experimental procedure of Example 1 was repeated, replacing the pure water with a mixture of pure water+5% by weight of methanol and reducing the temperature of the refrigerated chamber to −1° C.

Under these conditions, the average Δt of pure water+5% methanol/THF solutions in the absence of additive was 23.0 minutes.

Adding 0.5% by weight of macromer M extended the average Δt to 26.3 minutes.

EXAMPLE 3

The experimental procedure of Example 1 was repeated, replacing the pure water with a 3.5% by weight NaCl solution, and the temperature of the refrigerated chamber was reduced to −1° C. Under these conditions, the average Δt of NaCl/THF solutions in the absence of additive was 22.3 minutes.

Two additives, respectively macromer M and homopolymer A, were tested using the protocol described above with a concentration of 0.5% by weight. The average Δt value determined for macromer M was 27.1 minutes, and that for homopolymer A was 33.1 minutes.

EXAMPLES 4, 5, 6, 7, 8 AND 9

(comparative)

Different additives which did not fall within the scope of the invention were tested for comparison purposes under the conditions described above (Examples 1, 2 and 3):

Ex. 4: Polyvinyl pyrrolidone (mass average molecular weight: 500,000; 0.5% by weight);

Ex. 5: Polyvinyl pyrrolidone (mass average molecular weight: 1.5 million; 0.5% by weight);

Ex. 6: Polyacrylamide (mass average molecular weight: 1.0 million; 0.5% by weight);

Ex. 7: 40/60 acrylamide/acrylic acid copolymer (mass average molecular weight: 1.0 million; 0.5% by weight);

Ex 8: GAFFIX VC-713 (N-vinyl-2-pyrrolidone/N-vinyl-ε-caprolactame/dimethylaminoethyl methacrylate; 0.5% by weight);

Ex. 9: GAFFIX VC-713 (0.3% by weight);

Ex. 10: 55/45 acrylic acid/butyl acrylate copolymer (mass average molecular weight: 8.0 million; 0.5% by weight).

For these samples, the DPeff values were higher than the calculated DPmin, but none satisfied the first criterion wherein RDFTm is greater than 9. In this case, increasing DPeff did not bring about an improvement as regards the performances of the additive. The samples could not, as a result, slow the crystal growth rate.

Under the test conditions used, the Δts of these additives were substantially shorter than those of the substances of the invention, as the results shown in the above table demonstrate. It can also be seen that the two PVP with different molecular weights which were tested had Δts which were close. When an additive does not exhibit hydrate growth inhibiting properties, an increase in DPeff does not improve performances; the effect can even be the reverse.

EXAMPLE 10

In order to test the effectiveness of the products used in the process of the invention in the presence of methane hydrates, tests for forming hydrates from gas and water were carried out using the apparatus described below.

The apparatus comprised a 10 meter loop constituted by 7.7 mm diameter tubes, a 2 liter reactor comprising an inlet and an outlet for gas, and an intake and a discharge for the water and additive initially introduced. The reactor enabled the loop to be pressurised. Tubes with an analogous diameter to those of the loop allowed the fluid to circulate from the loop to the reactor and vice versa, by means of a gear pump placed between the two. A sapphire cell integrated into the circuit enabled the circulating liquid to be observed as well as the hydrates when they formed.

In order to determine the effectiveness of the additives of the invention, the fluid (water+additive) was introduced into the reactor. The apparatus was then pressurised to 7 MPa. The solution was homogenised by circulating it in the loop and reactor for one hour at 20° C. The pressure was kept constant by adding methane, and the temperature was gradually reduced (0.5° C./min) from 20° C. to 3° C., corresponding to the selected experimental temperature.

The principle of these tests was to determine the temperature at which the methane hydrates were formed in the loop and to evaluate the rate of growth and the quantity of hydrate crystals formed. Hydrate formation was detected by a release of heat and an increase in gas consumption.

In the absence of additive (medium: deionized water), the methane hydrates formed at a temperature close to 10.8° C. From the formation of the first crystals, two phases were observed regarding gas consumption. In the first phase (about 5 minutes), gas addition was very small, then in the second phase it became extremely high (flow meter open to maximum) until complete blockage of the fluid+hydrates mixture circulation in the loop+reactor ensemble. The second phase, corresponding to crystal growth and agglomeration, lasted 28 minutes and the total consumption was an average of 17 normal liters.

The addition of 0.5% by weight of macromer M with respect to the water slightly reduced the temperature at which the methane hydrates were formed (10.3° C.), under the pressure and temperature conditions of this test, and the gas consumption here too was in two phases. The first phase was analogous to that observed in pure water, the addition of gas to the system being very small. The second phase, in the absence of additive, corresponded to an explosive growth of crystals (maximum opening of flowmeter—large addition of gas to the medium) and to their agglomeration up to blocking the loop. In the presence of 0.5% of macromer M, crystal growth is substantially slowed. The addition of gas to the medium was about half as large (the flow meter was open to about 50% of its maximum capacity). The phase corresponding to the growth and agglomeration of crystals occurred over an average period of 50 minutes, i.e., over a period a few times longer. The total final consumption was almost identical.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A process for retarding at least one of the growth of hydrates and the agglomeration of hydrates and optionally for retarding the formation of hydtrates in a fluid comprising water and a gas, under conditions under which hydrates can form from the water and the gas, by incorporating a hydrate inhibiting quantity of at least one essentially water soluble polymer or copolymer into said fluid, wherein said polymer or copolymer was selected by a calculating for a given polymer or copolymer, the total number of rotational degrees of freedom per statistical repeat unit RDFTm and the degree of polymerisation of DP of the statistical repeat unit, and in that if RDFTm is over 9 and DP is in the range 18/RDFTm to 200,000, incorporating said water soluble polymer or copolymer into said fluid susceptible of forming hydrates.

2. A process according to claim 1, characterized in that said water soluble polymer or copolymer is incorporated in said fluid susceptible of forming hydrates if it has a total number of rotational degrees of freedom per statistical repeat unit RDFTm of over 10 and a degree of polymerisation per statistical repeat unit DP in the range 20/RDFTm to 100,000.

3. A process according to claim 1, characterized in that said polymer or copolymer is added to the fluid to be treated in a concentration of 0.05% to 5% by weight with respect to the water present in the fluid to be treated.

4. A process according to claim 3, characterized in that said concentration is 0.1% to 2% by weight with respect to the water present in the fluid to be treated.

5. A process according to claim 1, characterized in that said polymer or copolymer is mixed with at least one alcohol selected from monoalcohols and polyols containing 1 to 6 carbon atoms, in a proportion of 0.5% to 20% by weight with respect to the water present in the fluid to be treated.

6. A process according to claim 5, characterized in that said alcohol is mono-, di- or tri-ethylene glycol, ethanol or methanol.

7. A process according to claim 5, characterized in that said polymer or copolymer is first dissolved in a hydro-alcoholic medium then added to the fluid to be treated to obtain a final concentration of polymer or copolymer of 0.05% to 5% by weight with respect to the water present in the fluid to be treated.

8. A process according to claim 1, wherein said polymer or copolymer is a propylene glycol alginate, polyetheylene glycol monomethacrylate or polymers thereof or a homopolymer of sodium 2-acrylamido-2-methyl propane sulfonate.

9. A process according to claim 1, wherein said gas is selected from the group consisting of methane, ethane, ethylene, propane, propene, n-butane, isobutane, $H_2S$, $CO_2$ and mixtures thereof.

10. A process according to claim 8, wherein said gas is selected from the group consisting of methane, ethane, ethylene, propane, propene, n-butane, isobutane, $H_2S$, $CO_2$ and mixtures thereof.

* * * * *